(12) United States Patent
Yane

(10) Patent No.: US 11,590,740 B2
(45) Date of Patent: Feb. 28, 2023

(54) RESIN MEMBER, RESIN MOLDED BODY, CARTRIDGE, IMAGE FORMING APPARATUS, AND METHOD FOR MANUFACTURING RESIN MEMBER

(71) Applicant: CANON KABUSHIKI KAISHA, Tokyo (JP)

(72) Inventor: Akira Yane, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 84 days.

(21) Appl. No.: 16/934,603

(22) Filed: Jul. 21, 2020

(65) Prior Publication Data

US 2021/0031498 A1 Feb. 4, 2021

(30) Foreign Application Priority Data

Jul. 30, 2019 (JP) .............................. JP2019-140175

(51) Int. Cl.

| | | |
|---|---|---|
| *B32B 27/08* | (2006.01) | |
| *B32B 27/18* | (2006.01) | |
| *B32B 27/32* | (2006.01) | |
| *B32B 27/20* | (2006.01) | |
| *B32B 27/36* | (2006.01) | |
| *B32B 27/34* | (2006.01) | |
| *B29C 70/78* | (2006.01) | |
| *B29C 70/84* | (2006.01) | |
| *C08K 3/04* | (2006.01) | |
| *C08L 25/06* | (2006.01) | |
| *G03G 15/08* | (2006.01) | |
| *B32B 27/30* | (2006.01) | |
| *C08L 23/08* | (2006.01) | |
| *B29K 25/00* | (2006.01) | |
| *B29K 623/00* | (2006.01) | |

(52) U.S. Cl.
CPC .............. *B32B 27/08* (2013.01); *B29C 70/78* (2013.01); *B29C 70/84* (2013.01); *B32B 27/18* (2013.01); *B32B 27/302* (2013.01); *B32B 27/306* (2013.01); *C08K 3/04* (2013.01); *C08L 23/0853* (2013.01); *C08L 25/06* (2013.01); *G03G 15/0868* (2013.01); *B29K 2025/06* (2013.01); *B29K 2623/083* (2013.01); *B32B 2250/02* (2013.01); *B32B 2307/202* (2013.01); *G03G 15/0851* (2013.01)

(58) Field of Classification Search
None
See application file for complete search history.

(56) References Cited

U.S. PATENT DOCUMENTS 11,208,545 B2 * 12/2021 Yane .................. C08K 3/04

FOREIGN PATENT DOCUMENTS

JP 2015-105980 A 6/2015

* cited by examiner

*Primary Examiner* — Sheeba Ahmed
(74) *Attorney, Agent, or Firm* — Canon U.S.A., Inc., IP Division

(57) ABSTRACT

A resin member includes a base material and a resin molded body disposed on the base material, the resin molded body containing a main component constituted by an ethylene-vinyl acetate copolymer resin and a carbon black. The resin molded body has two or more peaks within a range of 25° C. to 80° C. in an endothermic curve obtained through measurement performed by heating from 25° C. to 150° C. at 5° C./min with a differential scanning calorimetry (DSC) apparatus.

7 Claims, 2 Drawing Sheets

RESIN MEMBER, RESIN MOLDED BODY, CARTRIDGE, IMAGE FORMING APPARATUS, AND METHOD FOR MANUFACTURING RESIN MEMBER

BACKGROUND OF THE INVENTION

Field of the Invention

The present disclosure relates to a resin member having electroconductivity. The present disclosure also relates to a cartridge in which the resin member is used, an image forming apparatus, and a method for manufacturing a resin member.

Description of the Related Art

In metal material replacement, a resin member having electroconductivity has been widely used as an electroconductive member in electronic devices such as digital single lens reflex cameras, compact digital cameras, smartphones, and personal computers.

Japanese Patent Laid-Open No. 2015-105980 discloses the detection of the remaining amount of developer by using a resin member having electroconductivity that includes a resin molded body in the form of a sheet disposed on a polystyrene resin base material, the resin molded body containing an ethylene-vinyl acetate copolymer that contains a carbon black.

However, in this resin member, peeling may occur at the interface of the base material and the resin molded body in environments such as those in which the temperature is increased to about 80° C.

SUMMARY OF THE INVENTION

A resin member provided to overcome the above-described disadvantage includes a base material and a resin molded body disposed on the base material, the resin molded body containing a main component constituted by an ethylene-vinyl acetate copolymer resin and a carbon black, wherein the resin molded body has two or more peaks within a range of 25° C. to 80° C. in an endothermic curve obtained through measurement performed by heating from 25° C. to 150° C. at 5° C./min with a differential scanning calorimetry (DSC) apparatus.

Further features of the present disclosure will become apparent from the following description of exemplary embodiments (with reference to the attached drawings).

DESCRIPTION OF THE EMBODIMENTS

Resin Member

Figure 1:
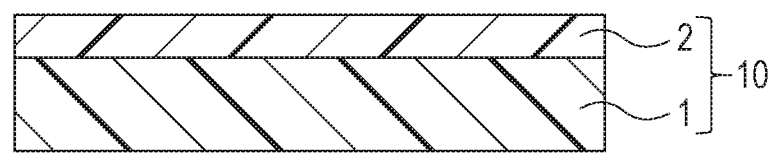
FIG. 1 is a schematic view of a resin member according to an embodiment of the present disclosure.

FIG. 1 is a schematic view of an embodiment of a resin member.

A resin member 10 includes a base material 1 and a resin molded body 2 disposed on the base material 1, the resin molded body 2 containing a main component constituted by an ethylene-vinyl acetate copolymer resin and a carbon black.

Base Material

The base material 1 has a linear expansion coefficient differing from the linear expansion coefficient of the resin molded body 2. In the present specification, the term "linear expansion coefficient" refers to a linear expansion coefficient within a range of 25° C. to 80° C. The material of the base material 1 is not particularly limited, and, for example, a polystyrene resin, a polyethylene resin, a polypropylene resin, an ABS resin, a polycarbonate resin, a polyacetal resin, or a polyethylene terephthalate resin can be used. Furthermore, a polyphenylene sulfide resin, a polyamide resin, or a polyimide resin can be used. The base material 1 is preferably a polystyrene resin, in view of facilitating the fusion-bonding of an ethylene-vinyl acetate copolymer resin thereto and making the occurrence of peeling less likely. Here, the term "polystyrene resin" refers to a resin having a structure represented by Structural Formula 1.

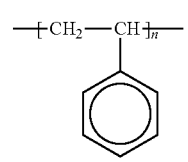

(Structural Formula 1)

The raw material of the polystyrene resin is not particularly limited, and, for example, a general-purpose polystyrene resin (GPPS resin) or a high-impact polystyrene resin (HIPS resin) can be used. As the polystyrene resin, a polystyrene resin on the market or a mixture of such resins can be used. Examples of commercially available polystyrene resins include Toyo Styrol series (manufactured by Toyo Styrene Co., Ltd.) and PSJ-Polystyrene series (manufactured by PS Japan Corporation). A HIPS resin is preferable, in view of excellent impact resistance.

A HIPS resin is generally a rubbery elastic member polymerized or dispersed in polystyrene to improve the impact resistance of a polystyrene resin. The type of the rubbery elastic member is not particularly limited, and examples thereof include butadiene rubber, styrene-butadiene rubber, acrylic rubber, acrylonitrile-butadiene rubber, and natural rubber. Examples of commercially available HIPS resins include NORYL series (manufactured by Saudi Basic Industries Corporation) and DICSTYRENE HIPS series (manufactured by DIC Corporation).

The thickness of the base material 1 is, for example, within a range of 300 μm to 1000 μm.

The method for manufacturing (method for molding) the base material 1 is not particularly limited, and, for example, extrusion molding, injection molding, press molding, or inflation molding can be used.

Resin Molded Body

The resin molded body 2 contains a main component constituted by an ethylene-vinyl acetate copolymer resin and a carbon black. In the present specification, the term "main component" refers to 80 parts by mass or more of the main component being contained with respect to 100 parts by mass of the resin molded body. That is, a resin molded body according to the present embodiment contains 80 parts by mass or more of an ethylene-vinyl acetate copolymer resin having a carbon black compounded therewith or dispersed therein. The resin molded body according to the present embodiment contains a main component constituted by an ethylene-vinyl acetate copolymer resin having a carbon black compounded therewith or dispersed therein, but may contain components other than the main component.

Ethylene-Vinyl Acetate Copolymer Resin

The ethylene-vinyl acetate copolymer resin contained in the resin molded body 2 is a resin represented by Structural Formula 2.

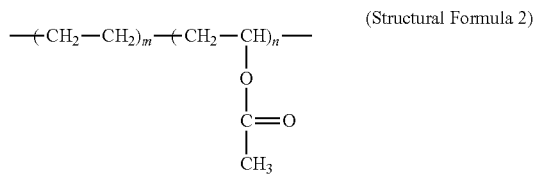
(Structural Formula 2)

The raw material of the ethylene-vinyl acetate copolymer resin used in the resin molded body 2 is not particularly limited, and an ethylene-vinyl acetate copolymer resin on the market or a mixture of such resins can be used. Examples of commercially available ethylene-vinyl acetate copolymer resins include ULTRASEN (manufactured by Tosoh Corporation.), EVAFLEX (manufactured by Du Pont-Mitsui Polychemicals Co., Ltd.), and SUNTEC EVA (manufactured by Asahi Kasei Chemicals Corporation). Further examples include UBE EVA Copolymer (manufactured by Ube-Maruzen Polyethylene Co., Ltd.), EVATATE (manufactured by Sumitomo Chemical Co., Ltd.), NOVATEC EVA (manufactured by Japan Polyethylene Corporation), SUMITATE (manufactured by Sumitomo Chemical Co., Ltd.), and NIPOFLEX (manufactured by Tosoh Corporation).

The proportion of vinyl acetate in the ethylene-vinyl acetate copolymer resin is preferably within a range of 5 parts by mass to 25 parts by mass with respect to 100 parts by mass of the ethylene-vinyl acetate copolymer resin. When the content of vinyl acetate is within this range, a combination of high electroconductivity and the thickness uniformity of the molded product can be achieved.

Carbon Black

A carbon black is contained in the resin molded body 2 to impart electroconductivity thereto. Carbon black is fine particles of carbon and is categorized into furnace black, channel black, acetylene black, Ketjen black, and the like depending on the starting raw material and the manufacturing method thereof. The raw material of the carbon black used in the resin molded body 2 is not particularly limited, and a carbon black on the market or a mixture of such carbon blacks can be used. Examples of commercially available carbon blacks include MA-7, MA-100, #970, #2200, and #2600 (each of the foregoing, manufactured by Mitsubishi Kasei Corporation). Further examples include Special Black-5, Special Black-100, Color Black S-170, and PRINTEX 140V (each of the foregoing, manufactured by Degussa Japan Co., Ltd.). Still further examples include Neo Spectra Mark 1, Neo Spectra Mark 5 (each of the foregoing, manufactured by Colombian Carbon Japan, Ltd.), SEAST, TOKABLACK, and Thermal Black (each of the foregoing, manufactured by Tokai Carbon Co., Ltd.).

The content of the carbon black is preferably within a range of 15 parts by mass to 50 parts by mass with respect to 100 parts by mass of the resin molded body. When the content of the carbon black is within this range, the resin molded body according to the present disclosure exhibits good adhesion and good electroconductivity. On the other hand, when the content of the carbon black is less than 15 parts by mass, electroconductivity may be unable to be sufficiently exhibited. When the content of the carbon black is more than 50 parts by mass, the resin component is decreased, which may result in insufficient adhesion to the base material.

Additives

To adjust various characteristics of the resin molded body 2, 20 parts by mass or less of various additives can be added thereto in addition to the main component. Examples of the various additives include resins, fillers, dispersants, oxidation inhibitors, weather-proofing agents, and decomposition inhibitors. More specific examples include lubricating and demolding agents such as fatty acid amides, fatty acid esters, and metal salts of fatty acids, ultraviolet absorbents such as benzotriazole compounds, benzophenone compounds, and phenyl salicylate compounds, and hindered amine stabilizers. Further such examples include phenolic or phosphorus oxidation inhibitors, tin heat stabilizers, slidability improvers such as polysiloxanes, and colorants such as various pigments represented by titanium oxides and the like and dyes.

Crystal Structure

The resin molded body 2 exhibits two or more peaks within a range of 25° C. to 80° C. in an endothermic curve A obtained through measurement performed by heating from 25° C. to 150° C. at 5° C./min with a differential scanning calorimetry (DSC) apparatus. When the resin molded body 2 has such endothermic characteristics, it is possible to provide a resin member in which the occurrence of peeling at the interface of the base material and the resin molded body 2 is less likely even in environments such as those in which the temperature is increased to about 80° C. The reason therefor is described as follows.

A resin molded body in the related art containing a main component constituted by an ethylene-vinyl acetate copolymer resin and a carbon black exhibits a single peak within a range of 80° C. to 110° C. in the endothermic curve A. This is the peak attributed to the melting point of the ethylene-vinyl acetate copolymer resin, that is, the peak attributed to an endothermic reaction occurring when crystals called spherulites are fused. When a resin member including this resin molded body in the related art disposed on the base material is moved from a room-temperature environment (e.g., of 25° C.) to a high-temperature environment of 80° C., peeling may occur at the interface of the base material and the resin molded body. This is caused by the difference in the linear expansion coefficient between the base material and the resin molded body, resulting in a difference in the amount of volume expansion between the base material and the resin molded body as the temperature change increases.

In the related art, the difference in the linear expansion coefficient of the ethylene-vinyl acetate copolymer resin serving as one constituent of the main component of the resin molded body compared with the linear expansion coefficient of a polystyrene resin serving as a preferable base material is small. Furthermore, because the ethylene-vinyl acetate copolymer resin exhibits excellent fusion-bonding properties with the polystyrene resin, the occurrence of peeling therebetween is less likely even when an environmental temperature change occurs.

However, because the resin molded body 2 contains a carbon black in addition to the ethylene-vinyl acetate copolymer resin, the resin molded body 2 has a small linear expansion coefficient compared with a resin molded body containing no carbon black. That is, the difference in the linear expansion coefficient between the resin molded body 2 and the polystyrene resin serving as the base material is larger than the difference in the linear expansion coefficient between the resin molded body containing no carbon black and the polystyrene resin. Thus, when an environmental temperature change occurs, the amount of volume expansion of the polystyrene resin becomes larger than the amount of volume expansion of the resin molded body 2, resulting in stress applied to the adhesive surface, which is the interface of the polystyrene resin and the resin molded body 2, in the direction of extending the resin molded body 2. When this stress exceeds adhesivity, peeling occurs between the base material and the resin molded body 2.

Thus, in the present embodiment, a structure in which the resin molded body 2 has two or more peaks within a range of 25° C. to 80° C. in the endothermic curve A is adopted. These peaks are regarded as the peaks attributed to a crystalline form of so-called secondary crystals where a portion of the amorphous regions other than those of spherulites are crystallized in a less-ordered manner.

As the resin molded body 2 expands with an increase in temperature, secondary crystals therein undergo fusion (phase transition) at a peak temperature attributed to the secondary crystals, resulting in a dimensional change. With this dimensional change, the difference in expansion between the resin molded body 2 and the base material is reduced, resulting in a decrease in the stress applied to the interface of the former and the latter, which enables the former and the latter to be kept in an adhesive state.

Here, the number of peaks of secondary crystals formed in the resin molded body 2 is two or more. With a single peak of secondary crystals, the enthalpy of fusion (heat of fusion) of secondary crystals is large, and, as a result, an expansion accompanying the fusion of secondary crystals is likely to be large. With a large expansion accompanying the fusion of secondary crystals, stress is applied to the adhesive surface in the direction of compressing the resin molded body 2, which hinders the prevention or reduction of peeling occurring between the resin molded body 2 and the base material. Here, when the enthalpy of fusion of secondary crystals (the sum of enthalpy of fusion calculated from the above-described peaks in the endothermic curve A) is 1.2 J/g or more, such peeling is likely to become apparent.

Each enthalpy of fusion calculated from each of the above-described peaks in the endothermic curve A is preferably 1.0 J/g or less. This is because, when each enthalpy of fusion calculated from each of the above-described peaks in the endothermic curve A is more than 1.0 J/g, an expansion accompanying the fusion of secondary crystals is large, which hinders the prevention or reduction of peeling occurring between the resin molded body 2 and the base material. Each enthalpy of fusion calculated from each of the above-described peaks in the endothermic curve A is more preferably 0.8 J/g or less.

The thickness of the resin molded body 2 is preferably within a range of 30 μm to 1000 μm. This is because, when the thickness is within this range, suitable use for various electronic devices is enabled.

Method for Manufacturing Resin Member

A method for manufacturing a resin member according to the present disclosure, including kneading and molding steps, is not limited to a particular method; however, hereafter, a method for manufacturing the resin member 10 through insert molding will be described.

Kneading Step

First, an ethylene-vinyl acetate copolymer resin and a carbon black are mixed, and a resin composition formed from the mixture is subjected to melting and kneading. The method for melting and kneading the resin composition is not particularly limited, and an example of the method is a method in which the resin composition is subjected to melting and shearing by using a screw or a blade, such as a method using a double-screw extruder, a kneader, or the like. Another example of the method is a method in which the resin composition is passed over a plurality of adjacent rolls to thereby be subjected to melting and shearing, such as a method using a roll mill. Furthermore, there exists a method in which the sheared resin composition, after being continuously ejected in the form of strands, is finely cut to thereby be subjected to pelletization. There also exists a method in which the sheared resin composition is taken out in the form of a resin block and fed into a pulverizer to thereby be subjected to miniaturization.

Molding Step

Next, by solidifying (molding) the resin composition, a resin molded body in the form of a sheet is obtainable. As a method for obtaining a resin molded body in the form of a sheet, there exists an extrusion molding method in which the resin composition is plasticized with a screw, ejected from a die with which the plasticized resin composition is expanded into the form of a sheet, and taken up by using one or more rolls. Furthermore, there exists an inflation molding method in which the plasticized resin composition is ejected from a die in a columnar form and blown into a columnar form with air and in which the resulting sheets in a columnar form are continuously taken up. There also exists a calendar molding method in which a resin composition is melted over two rolls and extended to a desired film thickness through a plurality of rolls to thereby form the resin composition into a sheet. Among these, an extrusion molding method is particularly preferable. In the process of molding melted resin compositions such as those described above into the form of sheets, spherulites are formed.

Secondary Crystallization Step

Next, by performing heat treatment, secondary crystals are obtainable. An example of a method for obtaining secondary crystals is a method in which a resin molded body in the form of a sheet formed in the molding step is heat-pressed with a heat press apparatus. Furthermore, there exists a method in which a sheet is passed over one or more heated rolls. A peak of secondary crystals is formed at around this heating temperature. Thus, when two or more peaks are formed in the endothermic curve A, it is needed to perform heat treatment two or more times at two or more temperatures within a range of 25° C. to 80° C. When the heat treatment time is long, the number of crystals increases and the enthalpy of fusion attributed to peaks is increased; therefore, the heat treatment time at a single temperature is preferably 60 seconds or less.

Layering Step

Next, the resin molded body 2 is placed in a mold. A resin serving as the raw material of the base material 1 is injected into the mold while being melted to thereby perform insert molding. As a result, the resin member 10 according to the present disclosure is obtained. In the resin member 10, the resin molded body 2 is provided on the base material 2. The molding conditions during insert molding to obtain the resin member 10 are not particularly limited; however, to obtain high adhesivity, adopting a structure in which the polymer chains of the ethylene-vinyl acetate copolymer resin contained in the resin molded body 2 and the polymer chains of the resin serving as the raw material of the base material 1 mutually intervene is preferable. Thus, when these resins are caused to adhere to each other, the surface of at least one of these resins has preferably been heat-melted.

The resin member 10 is obtainable through the above-described steps.

Cartridge

The resin member 10 can be used in an electroconductive portion where a metal member has been used in the related art. Specifically, a metal plate used in a cartridge can be replaced with the resin member 10. The resin member 10 can be suitably used in an electrostatic capacitance detecting unit of a cartridge.

Figure 2:
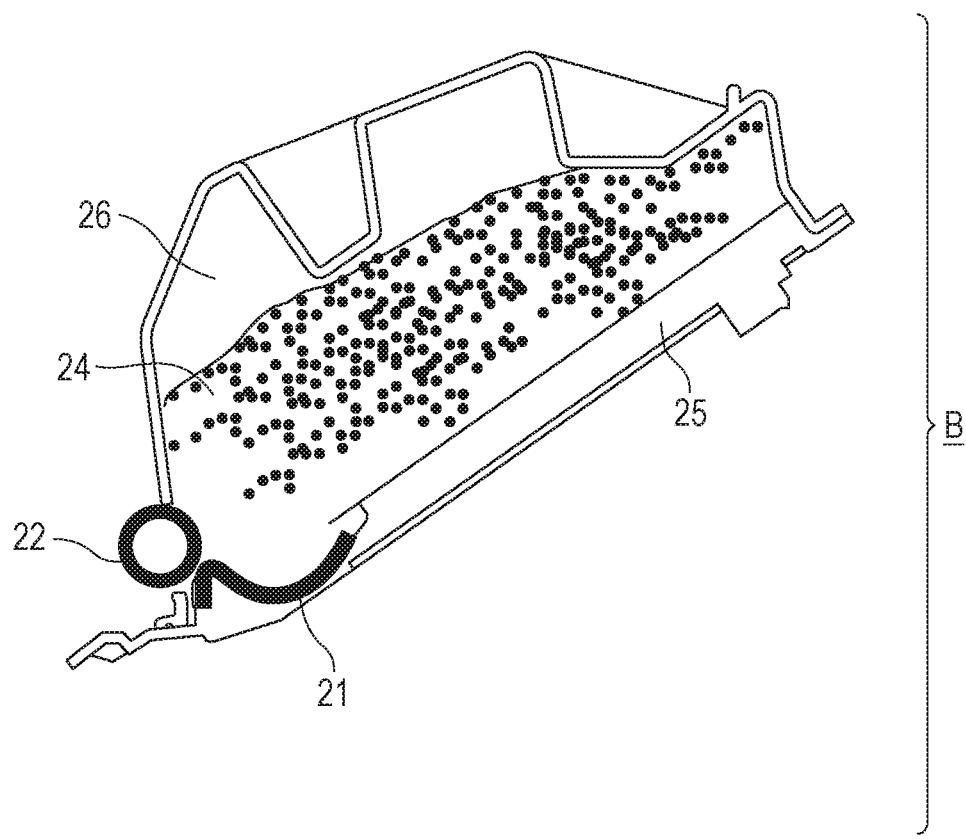
FIG. 2 is a schematic sectional view of a cartridge according to an embodiment of the present disclosure.

A cartridge according to the present embodiment will be described with reference to a schematic sectional view of FIG. 2.

An electrostatic capacitance detecting unit 21 is integrally molded with a frame 25, and the resin member 10 can be used therein. Specifically, the resin molded body 2 can serve as the electrostatic capacitance detecting unit 21 and the base material 1 can serve as the frame 25. Furthermore, the electrostatic capacitance detecting unit 21 is electrically connected to a contact unit (not illustrated). The contact unit is disposed to enable the electrical connection to an external device. A developer storage unit 26 stores developer and is fixed to the frame 25 by way of, for example, heat seal. In this example, toner 24 is used as the developer. The cartridge B includes a developing roller 22. The electrostatic capacitance detecting unit 21 has electroconductivity and therefore can detect the electrostatic capacitance between the electrostatic capacitance detecting unit 21 and the developing roller 22. Thus, changes in the electrostatic capacitance in accordance with changes in the amount of the toner 24 present in the developer storage unit 26 can be detected.

Image Forming Apparatus

Figure 3:
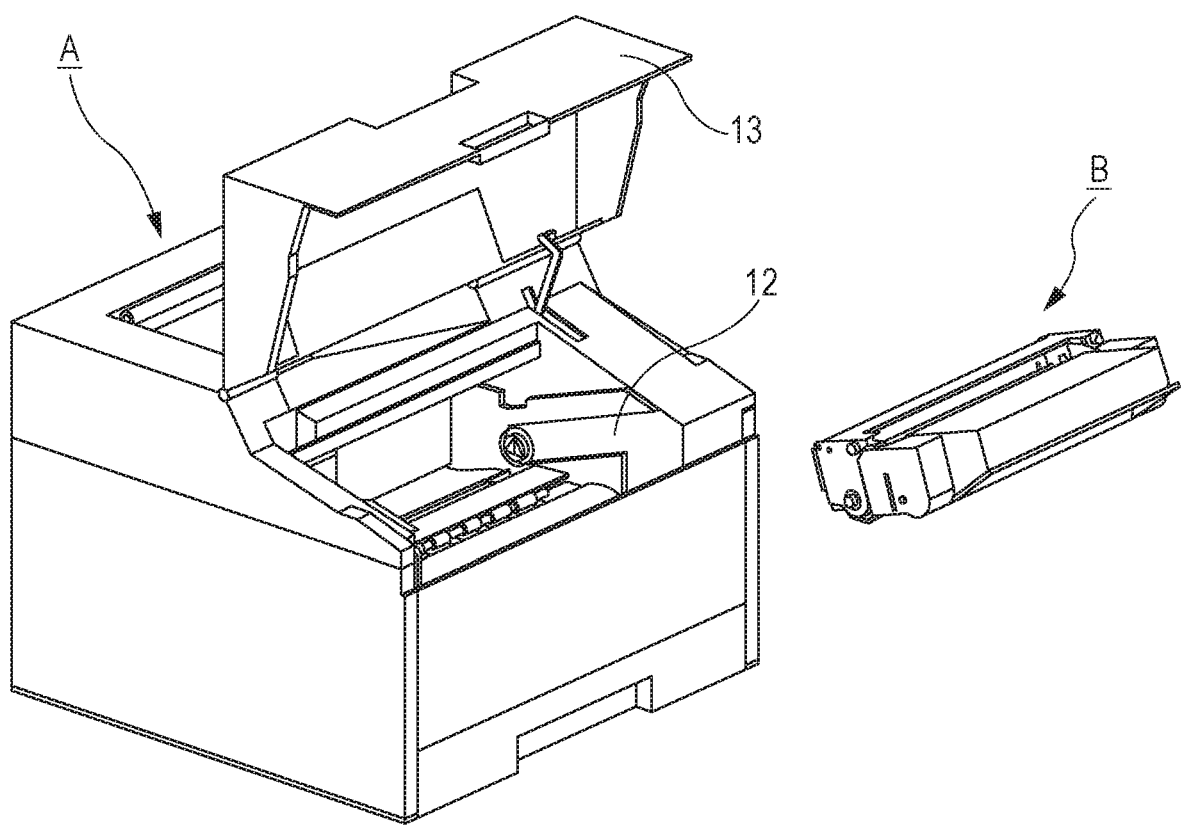
FIG. 3 is a schematic view of an image forming apparatus according to an embodiment of the present disclosure.

FIG. 3 is a schematic view of an embodiment of an image forming apparatus. An image forming apparatus A has an opening-closing door 13 configured to attach and detach the cartridge B. FIG. 3 illustrates a state in which the opening-closing door 13 is opened. When the cartridge B is attached, along the guide rail 12, to the image forming apparatus A, a developer remaining amount detecting unit (not illustrated) in the image forming apparatus A and the contact unit of the cartridge B are electrically connected. Adopting such a structure enables the image forming apparatus A to detect the amount of the toner 24 remaining in the cartridge B and to indicate the amount.

EXAMPLES

Hereafter, the present disclosure will be described with reference to Examples.

Prior to the description of Examples, the evaluation method performed in Examples is described.

Evaluation Method

Measurement of Endothermic Curve and Calculation of Enthalpy of Fusion of Secondary Crystals The measurement of the endothermic curve A of the resin molded body was performed with a differential scanning calorimetry apparatus (product name: DSC823, manufactured by Mettler-Toledo, Inc.) in accordance with the method described in JIS K7122: 2012 "Method for Measuring Heat of Transition of Plastics".

However, the sampling method and the temperature conditions were applied as follows.

Into a measuring container made of aluminum, 15 mg of a sample resin molded body was filled, held at 25° C. for 10 minutes at a nitrogen gas flow rate of 20 ml/min, and heated from 25° C. to 150° C. to obtain an endothermic curve A. The temperature increase rate was 5° C./min and the reference substance was alumina.

The temperature at which the maximum amount of heat absorption was exhibited within a range of 25° C. to 80° C. in the obtained endothermic curve A was determined as the fusion peak temperature of secondary crystals.

The intersection of the extension of the linear portion of the endothermic curve A before the melting start of secondary crystals and the extension of the linear portion during the melting of secondary crystals was determined to be the secondary crystal melting start temperature. The intersection of the extension of the linear portion after the melting end of secondary crystals and the extension of the linear portion during the melting was determined to be the secondary crystal melting end temperature. A straight line was drawn between the secondary crystal melting start temperature and the secondary crystal melting end temperature and was determined to be the baseline. The enthalpy of fusion of secondary crystals was calculated from the area of a portion surrounded by a baseline and a secondary crystal fusion peak.

When two peaks overlapped, a straight line was drawn between the secondary crystal melting start temperature of the low-temperature side of the peaks and the secondary crystal melting end temperature of the high-temperature side of the peaks. This straight line was determined to be the baseline, and the portion from the secondary crystal melting start temperature to the intermediate temperature of the fusion peak was determined to be the enthalpy of fusion of the low-temperature side of the peaks, while the portion from the intermediate temperature to the secondary crystal melting end temperature was determined to be the enthalpy of fusion of the high-temperature side of the peaks. When three or more peaks overlapped, the baseline was set through the above-described method, after which the portions between the midpoints of adjacent peaks were determined to be the enthalpy of fusion of secondary crystals of the peaks.

An enthalpy of fusion of 0.05 J/g or less was determined to be a peak attributed to measurement variation and therefore was not counted as a secondary crystal fusion peak.

Peeling Confirmation

A total of 32 resin members were formed, and after being left to stand under conditions of a temperature of 25° C. and a humidity of 50% for 24 hours, each resin member was moved to an environment of a temperature of 80° C. and a humidity of 80% and left to stand for another 24 hours. The presence or absence of peeling at the interface of the base material and the resin molded body after each resin member was left to stand was confirmed visually and with an optical microscope.

Adhesivity Measurement

A total of 32 resin members were formed, and after being left to stand under conditions of a temperature of 25° C. and a humidity of 50% for 24 hours, each resin member was moved to an environment of a temperature of 80° C. and a humidity of 80% and left to stand for another 24 hours. The adhesivity of each resin member after being left to stand was measured with an adhesion/film peeling analyzer (product name: VPA-3, manufactured by Kyowa Interface Science, Co., Ltd.). From 150 mm of each resin member in the longitudinal direction, 50 mm was peeled off and mounted on a chuck. The load applied when the peeling of the peeled-off resin member portion occurred at a peel rate of 200 mm/min and a peeling angle of 90° was measured. The average value of a portion corresponding to 100 mm to 130 mm from the end portion of the peeled side of the peeled-off resin member portion was determined to be the adhesivity.

Example 1

As the ethylene-vinyl acetate copolymer resin, EVAFLEX EV450 (hereafter called A-1) manufactured by Du Pont- Mitsui Polychemicals Co., Ltd. was used. As the carbon black, SEAST G-FY (hereafter called B-1) manufactured by Tokai Carbon Co., Ltd. was used. Weighing was performed to achieve a mixing ratio of 55 parts by mass of A-1 to 45 parts by mass of B-1, and stirring was performed by using a tumbler for 10 minutes to obtain a mixture. The obtained mixture was kneaded by using a kneader (double-screw kneader, product name: PCM-30, manufactured by Ikegai Corporation) to obtain a resin composition in the form of pellets. The kneading conditions are presented below.
Extrusion capacity: 4.0 kg/h
Barrel temperature: 170° C.
Die temperature: 170° C.
Screw rotational speed: 250 rpm The obtained resin composition was then extrusion molded by using a sheet extruder with a coat hanger die of a single-screw extruder (product name: GT-40, manufactured by Research Laboratory of Plastics Technology Co., Ltd.) connected thereto, the coat hanger die having a width of 600 mm, to obtain a resin molded body in the form of a sheet having a thickness of 100 μm. The extrusion molding conditions are presented below.
Extrusion capacity: 5.0 kg/h
Die temperature: 190° C.
Roller temperature: 50° C.
Take-up speed: 6.4 m/min
Distance between die slip and roller: 50 mm The obtained resin molded body in the form of a sheet was cut out into a size of 150 mm in length and 25 mm in width. After being cut out, the resin molded body was pressed by using a heat press apparatus (product name: VN02-2020C, manufactured by Mikado Technos Co., Ltd.) at a load of 3 kN at a temperature of 60° C. for 15 seconds and then at a temperature of 45° C. for another 15 seconds.

In the measurement of the endothermic curve of the obtained resin molded body, peaks were obtained at 43° C. and 58° C. The enthalpy of fusion calculated from each peak was 0.60 J/g and 0.70 J/g, respectively.

The heat-treated resin molded body in the form of a sheet was then stuck to a flat plate mold having a length of 250 mm, a width of 250 mm, and a thickness of 3 mm Subsequently, by using an injection molding machine (product name: SE-180D, manufactured by Sumitomo Heavy Industries, Ltd.), insert molding was performed by injecting a polystyrene resin (product name: NR1200, manufactured by Toyo Styrene Co., Ltd.) serving as the base material to obtain a resin member of Example 1. The temperature conditions for insert molding were a cylinder temperature of 200° C. and a mold temperature of 50° C.

A total of 32 resin members were formed, and peeling confirmation was performed thereon. The results confirmed the absence of peeling in any of the 32 resin members.

Furthermore, adhesivity measurement was performed, and the results revealed that each resin member had an adhesivity of 1.25 N/25 mm, indicating the maintenance of sufficient adhesivity.

Table 1 summarizes the manufacturing conditions and Table 2 summarizes the evaluation results.

TABLE 1

| | | Unit | Example 1 | Example 2 | Example 3 | Example 4 | Example 5 | Example 6 | Example 7 |
|---|---|---|---|---|---|---|---|---|---|
| EVA raw material | A-1 | Mass % | 55 | 55 | 55 | 55 | 55 | 55 | 55 |
| | A-2 | Mass % | | | | | | | |
| CB raw material | B-1 | Mass % | 45 | 45 | 45 | 45 | 45 | 45 | 45 |
| | B-2 | Mass % | | | | | | | |
| Heat treatment temperature | First time | ° C. | 45 | 30 | 50 | 45 | 45 | 45 | 45 |
| | Second time | ° C. | 60 | 50 | 70 | 55 | 60 | 60 | 60 |
| | Third time | ° C. | | | | 65 | | | |
| Heat treatment time | First time | s | 15 | 15 | 15 | 15 | 30 | 60 | 15 |
| | Second time | s | 15 | 15 | 15 | 15 | 15 | 15 | 30 |
| | Third time | s | | | | 20 | | | |

| | | Unit | Example 8 | Example 9 | Example 10 | Example 11 | Example 12 | Example 13 | Example 14 |
|---|---|---|---|---|---|---|---|---|---|
| EVA raw material | A-1 | Mass % | 55 | 50 | 55 | 55 | 45 | | 55 |
| | A-2 | Mass % | | | | | | 85 | |
| CB raw material | B-1 | Mass % | 45 | 50 | 45 | 45 | 55 | | 45 |
| | B-2 | Mass % | | | | | | 15 | |
| Heat treatment temperature | First time | ° C. | 45 | 45 | 45 | 45 | 45 | 45 | 45 |
| | Second time | ° C. | 60 | 60 | 60 | 60 | 60 | 60 | 80 |
| | Third time | ° C. | | | | | | | |
| Heat treatment time | First time | s | 15 | 15 | 180 | 15 | 15 | 15 | 15 |
| | Second time | s | 60 | 15 | 15 | 180 | 15 | 15 | 15 |
| | Third time | s | | | | | | | |

TABLE 2

| | Unit | Example 1 | Example 2 | Example 3 | Example 4 | Example 5 | Example 6 | Example 7 |
|---|---|---|---|---|---|---|---|---|
| Peak temperature 1 | °C. | 43 | 26 | 47 | 42 | 43 | 43 | 43 |
| Peak temperature 2 | °C. | 58 | 48 | 67 | 53 | 58 | 58 | 58 |
| Peak temperature 3 | °C. | | | | 62 | | | |
| Enthalpy of fusion 1 | J/g | 0.60 | 0.70 | 0.60 | 0.50 | 0.67 | 0.75 | 0.54 |
| Enthalpy of fusion 2 | J/g | 0.70 | 0.70 | 0.70 | 0.60 | 0.68 | 0.64 | 0.74 |
| Enthalpy of fusion 3 | J/g | | | | 0.50 | | | |
| Sum of enthalpy of fusion | J/g | 1.30 | 1.40 | 1.30 | 1.60 | 1.35 | 1.39 | 1.28 |
| Adhesivity | N/25 mm | 1.25 | 1.21 | 1.23 | 1.38 | 0.96 | 0.71 | 0.89 |
| Peeling occurrences | n/32 | 0 | 0 | 0 | 0 | 0 | 0 | 0 |

| | Unit | Example 8 | Example 9 | Example 10 | Example 11 | Example 12 | Example 13 | Example 14 |
|---|---|---|---|---|---|---|---|---|
| Peak temperature 1 | °C. | 43 | 43 | 43 | 43 | 43 | 43 | 43 |
| Peak temperature 2 | °C. | 58 | 58 | 58 | 58 | 58 | 58 | 78 |
| Peak temperature 3 | °C. | | | | | | | |
| Enthalpy of fusion 1 | J/g | 0.48 | 0.56 | 0.91 | 0.58 | 0.56 | 0.65 | 0.96 |
| Enthalpy of fusion 2 | J/g | 0.78 | 0.65 | 0.48 | 0.86 | 0.65 | 0.73 | 0.38 |
| Enthalpy of fusion 3 | J/g | | | | | | | |
| Sum of enthalpy of fusion | J/g | 1.26 | 1.21 | 1.39 | 1.44 | 1.21 | 1.38 | 1.34 |
| Adhesivity | N/25 mm | 0.52 | 0.74 | 0.32 | 0.46 | 0.74 | 1.18 | 0.04 |
| Peeling occurrences | n/32 | 0 | 0 | 0 | 0 | 0 | 0 | 13 |

Examples 2 to 13

In Examples 2 to 13, the raw materials of the ethylene-vinyl acetate copolymer resin and the carbon black, the mixing ratio of the former to the latter, and the heat treatment conditions were changed as presented in Table 1, a resin molded body and a resin member were produced through the same method as in Example 1, and evaluation was performed. The results are presented in Table 2. In any of these Examples, two or more peaks were confirmed within a range of 25° C. to 80° C. Furthermore, in any of these Examples, the absence of peeling was confirmed.

The raw materials used are as follows.
(A) Ethylene-vinyl acetate copolymer resin (EVA raw material)
A-1: EVAFLEX EV450, manufactured by Du Pont-Mitsui Polychemicals Co., Ltd.
A-2: EVAFLEX EV250, manufactured by Du Pont-Mitsui Polychemicals Co., Ltd.
(B) Carbon black (CB raw material)
B-1: SEAST G-FY, manufactured by Tokai Carbon Co., Ltd.
B-2: Ketjen black (EC600JD), manufactured by Lion Specialty Chemicals Co., Ltd.

Example 14

Example 14 differs from Example 1 in the heat treatment conditions.

The obtained resin molded body was cut out into a size of 150 mm in length and 25 mm in width. The cut-out resin molded body was pressed by using a heat press apparatus (product name: VN02-2020C, manufactured by Mikado Technos Co., Ltd.) at a load of 3 kN at a temperature of 80° C. for 15 seconds and then at a temperature of 45° C. for another 15 seconds.

In the measurement of the endothermic curve of the obtained resin molded body, peaks were obtained at 43° C. and 78° C. The enthalpy of fusion calculated from each peak was 0.96 J/g and 0.38 J/g, respectively.

The heat-treated resin molded body in the form of a sheet was then stuck to a flat plate mold having a length of 250 mm, a width of 250 mm, and a thickness of 3 mm Subsequently, by using an injection molding machine (product name: SE-180D, manufactured by Sumitomo Heavy Industries, Ltd.), insert molding was performed by injecting a polystyrene resin (product name: NR1200, manufactured by Toyo Styrol Co., Ltd.) serving as the base material to obtain a resin member of Example 14. The temperature conditions for insert molding were a cylinder temperature of 200° C. and a mold temperature of 50° C.

A total of 32 resin members were formed, and peeling confirmation was performed thereon. The results confirmed the presence of peeling in 13 resin members and the absence of peeling in one half or more of the total number of resin members.

The conceivable cause thereof is that, although two locations of peaks of secondary crystals were present within a range of 25° C. to 80° C., the high-temperature side of the peaks was 78° C., which was close to the melting point, thereby resulting in the enthalpy of fusion of the low-temperature side of the peaks being more than 0.8 J/g.

Comparative Example 1

Comparative Example 1 differs from Example 1 in the heat treatment conditions.

The obtained resin molded body was cut out into a size of 150 mm in length and 25 mm in width. The cut-out resin molded body was pressed by using a heat press apparatus (product name: VN02-2020C, manufactured by Mikado Technos Co., Ltd.) at a load of 3 kN at a temperature of 45° C. for 180 seconds.

In the measurement of the endothermic curve of the obtained resin molded body, a peak was obtained at 43° C. The enthalpy of fusion calculated from the peak was 1.38 J/g.

The heat-treated resin molded body in the form of a sheet was then stuck to a flat plate mold having a length of 250 mm, a width of 250 mm, and a thickness of 3 mm Subsequently, by using an injection molding machine (product name: SE-180D, manufactured by Sumitomo Heavy Industries, Ltd.), insert molding was performed by injecting a polystyrene resin (product name: NR1200, manufactured by Toyo Styrol Co., Ltd.) serving as the base material to obtain a resin member of Comparative Example 1. The temperature conditions for insert molding were a cylinder temperature of 200° C. and a mold temperature of 50° C.

A total of 32 resin members were formed, and peeling confirmation was performed thereon. The results confirmed the presence of peeling in 18 resin members.

Furthermore, adhesivity measurement was performed, and the results revealed that each resin member had an adhesivity of 0.12 N/25 mm and that the adhesivity was almost lost also in the unpeeled portion thereof.

The conceivable cause thereof is that, because only a single location of peaks of secondary crystals was present, the resin molded body underwent a large expansion within a narrow temperature range, which contributed to increased stress applied to the adhesive surface, thereby resulting in the occurrence of peeling in a portion where stress exceeded adhesivity.

Table 3 summarizes the manufacturing conditions and Table 4 summarizes the evaluation results.

TABLE 3

|  |  | Unit | Comparative Example 1 | Comparative Example 2 | Comparative Example 3 |
|---|---|---|---|---|---|
| EVA raw material | A-1 | Mass % | 55 | 55 | 55 |
|  | A-2 | Mass % |  |  |  |
| CB raw material | B-1 | Mass % | 45 | 45 | 45 |
|  | B-2 | Mass % |  |  |  |
| Heat treatment temperature | First time | ° C. | 45 | 60 |  |
|  | Second time | ° C. |  |  |  |
|  | Third time | ° C. |  |  |  |
| Heat treatment time | First time | S | 180 | 180 |  |
|  | Second time | S |  |  |  |
|  | Third time | S |  |  |  |

TABLE 4

|  | Unit | Comparative Example 1 | Comparative Example 2 | Comparative Example 3 |
|---|---|---|---|---|
| Peak temperature 1 | ° C. | 43 | 58 |  |
| Peak temperature 2 | ° C. |  |  |  |
| Peak temperature 3 | ° C. |  |  |  |
| Enthalpy of fusion 1 | J/g | 1.38 | 1.46 |  |
| Enthalpy of fusion 2 | J/g |  |  |  |
| Enthalpy of fusion 3 | J/g |  |  |  |
| Sum of enthalpy of fusion | J/g | 1.38 | 1.46 |  |
| Adhesivity | N/25 mm | 0.12 | 0.09 | 0.11 |
| Peeling occurrences | n/32 | 18 | 28 | 32 |

Comparative Example 2

Comparative Example 2 differs from Comparative Example 1 in the heat treatment conditions.

The obtained resin molded body was cut out into a size of 150 mm in length and 25 mm in width. The cut-out resin molded body was pressed by using a heat press apparatus (product name: VN02-2020C, manufactured by Mikado Technos Co., Ltd.) at a load of 3 kN at a temperature of 60° C. for 180 seconds.

In the measurement of the endothermic curve of the obtained resin molded body, a peak was obtained at 58° C. The enthalpy of fusion calculated from the peak was 1.46 J/g.

The heat-treated resin molded body in the form of a sheet was then stuck to a flat plate mold having a length of 250 mm, a width of 250 mm, and a thickness of 3 mm Subsequently, by using an injection molding machine (product name: SE-180D, manufactured by Sumitomo Heavy Industries, Ltd.), insert molding was performed by injecting a polystyrene resin (product name: NR1200, manufactured by Toyo Styrol Co., Ltd.) serving as the base material to obtain a resin member of Comparative Example 2. The temperature conditions for insert molding were a cylinder temperature of 200° C. and a mold temperature of 50° C.

A total of 32 resin members were formed, and peeling confirmation was performed thereon. The results confirmed the presence of peeling in 28 resin members.

Furthermore, adhesivity measurement was performed, and the results revealed that each resin member had an adhesivity of 0.09 N/25 mm and that the adhesivity was almost lost also in the unpeeled portion thereof.

The conceivable cause thereof is that, because only a single location of peaks of secondary crystals was present, the resin molded body in the form of a sheet underwent a large expansion within a narrow temperature range, which contributed to increased stress applied to the adhesive surface, thereby resulting in the occurrence of peeling in a portion where stress exceeded adhesivity.

Comparative Example 3

In Comparative Example 3, no heat treatment was performed.

In the measurement of the endothermic curve of the obtained resin molded body, no peaks were confirmed.

The resin molded body in the form of a sheet was then stuck to a flat plate mold having a length of 250 mm, a width of 250 mm, and a thickness of 3 mm Subsequently, by using an injection molding machine (product name: SE-180D, manufactured by Sumitomo Heavy Industries, Ltd.), insert molding was performed by injecting a polystyrene resin (product name: NR1200, manufactured by Toyo Styrol Co., Ltd.) serving as the base material to obtain a resin member of Comparative Example 3. The temperature conditions for insert molding were a cylinder temperature of 200° C. and a mold temperature of 50° C.

A total of 32 resin members were formed, and peeling confirmation was performed thereon. The results confirmed the presence of peeling in all the 32 resin members.

Furthermore, adhesivity measurement was performed, and the results revealed that each resin member had an adhesivity of 0.11 N/25 mm and that the adhesivity was almost lost also in the unpeeled portion thereof.

The conceivable cause thereof is that, because peaks of secondary crystals were absent, with an increase in temperature, the difference in expansion between the resin molded body in the form of a sheet and the base material was increased, which contributed to increased stress applied to the adhesive surface, thereby resulting in the occurrence of peeling in a portion where stress exceeded adhesivity.

Thus, in Examples 1 to 14 in which two or more peaks were exhibited within a range of 25° C. to 80° C. in an endothermic curve obtained through measurement performed by heating from 25° C. to 150° C. at 5° C./min with a differential scanning calorimetry (DSC) apparatus, the occurrence of peeling was better prevented or reduced than in Comparative Examples 1 to 3.

Particularly in Examples 1 to 13 in which each enthalpy of fusion of secondary crystals was 0.8 J/g or less, the occurrence of peeling was better prevented or reduced than in Comparative Example 14.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-140175, filed Jul. 30, 2019, which is hereby incorporated by reference herein in its entirety.

What is claimed is:

1. A resin member comprising:
a polystyrene resin base material; and
a resin molded body disposed on the polystyrene resin base material, the resin molded body containing a main component constituted by an ethylene-vinyl acetate copolymer resin and a carbon black,
wherein a content of the carbon black is within a range of 15 parts by mass to 50 parts by mass with respect to 100 parts by mass of the resin molded body,
wherein a thickness of the resin molded body is within a range of 30 μm to 1000 μm, and
wherein the resin molded body has two or more peaks within a range of 25° C. to 80° C. in an endothermic curve obtained through measurement performed by heating from 25° C. to 150° C. at 5° C./min with a differential scanning calorimetry apparatus.

2. The resin member according to claim 1,
wherein each enthalpy of fusion of secondary crystals in the resin molded body calculated from each of the two or more peaks is 1.0 J/g or less.

3. The resin member according to claim 1,
wherein each enthalpy of fusion of secondary crystals in the resin molded body calculated from each of the two or more peaks is 0.8 J/g or less.

4. The resin member according to claim 1,
wherein a sum of enthalpy of fusion of secondary crystals in the resin molded body calculated from each of the two or more peaks is 1.2 J/g or more.

5. A resin molded body comprising:
an ethylene-vinyl acetate copolymer resin; and
a carbon black,
wherein a main component is constituted by the ethylene-vinyl acetate copolymer resin and the carbon black,
wherein a content of the carbon black is within a range of 15 parts by mass to 50 parts by mass with respect to 100 parts by mass of the resin molded body,
wherein a thickness of the resin molded body is within a range of 30 μm to 1000 μm, and
wherein the resin molded body has two or more peaks within a range of 25° C. to 80° C. in an endothermic curve obtained through measurement performed by heating from 25° C. to 150° C. at 5° C./min with a differential scanning calorimetry apparatus.

6. A cartridge comprising:
the resin member according to claim 1; and
a contact unit electrically connected to the resin molded body of the resin member,
wherein the resin molded body serves as an electrostatic capacitance detecting unit configured to detect electrostatic capacitance.

7. An image forming apparatus comprising:
a developer remaining amount detecting unit,
wherein the developer remaining amount detecting unit and the contact unit of the cartridge according to claim 6 are electrically connected.

* * * * *